US008121722B2

(12) United States Patent
Tourdot et al.

(10) Patent No.: US 8,121,722 B2
(45) Date of Patent: Feb. 21, 2012

(54) POWERED MOBILE STORAGE SYSTEM WITH SELECT AND DRAG OPERATION AND SELECTABLE AISLE WIDTH FEATURE

(75) Inventors: Matthew A. Tourdot, Whitewater, WI (US); James C. Muth, Oconomowoc, WI (US); William W. R. Lynt, III, Fort Atkinson, WI (US); William B. McHenry, Fort Atkinson, WI (US); Steven M. Lehmann, Fort Atkinson, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 636 days.

(21) Appl. No.: 11/813,302

(22) PCT Filed: Mar. 3, 2006

(86) PCT No.: PCT/US2006/007847
§ 371 (c)(1),
(2), (4) Date: Jul. 3, 2007

(87) PCT Pub. No.: WO2006/094266
PCT Pub. Date: Sep. 8, 2006

(65) Prior Publication Data
US 2008/0133046 A1 Jun. 5, 2008

(51) Int. Cl.
*G06F 7/00* (2006.01)

(52) U.S. Cl. ............................................................ 700/213
(58) Field of Classification Search ................. 700/213; 211/1.57; 312/201, 199, 198; 104/307; 414/787
See application file for complete search history.

(56) References Cited

U.S. PATENT DOCUMENTS

| 4,412,772 | A | * | 11/1983 | Naito et al. | 312/199 |
| 5,636,750 | A | | 6/1997 | Heyl | |
| 7,032,762 | B2 | * | 4/2006 | Miyazaki et al. | 211/162 |
| 7,484,631 | B2 | * | 2/2009 | Bothun et al. | 211/162 |
| 7,508,145 | B2 | * | 3/2009 | Bourke et al. | 318/34 |
| 2006/0290243 | A1 | * | 12/2006 | Smith | 312/201 |

* cited by examiner

*Primary Examiner* — Ramya Burgess
(74) *Attorney, Agent, or Firm* — Andrus, Sceales, Starke & Sawall, LLP

(57) ABSTRACT

The present invention is a mobile storage system that includes a number of mobile storage units movably disposed with respect to one another and including a logic system. A signal from a motion control actuator on a mobile storage unit which is to move where an aisle is desired directs a run signal to at least one unit to cause one or multiple units to be driven successively away from a desired aisle. If multiple units are moved together, a motion control actuator on the unit adjacent the closing aisle is operated to move the actuated unit and the other units. The logic system remembers and maintains each new open aisle width and closed aisle width after the termination of a particular movement.

19 Claims, 3 Drawing Sheets

POWERED MOBILE STORAGE SYSTEM WITH SELECT AND DRAG OPERATION AND SELECTABLE AISLE WIDTH FEATURE

FIELD OF THE INVENTION

The present invention relates to storage systems including mobile storage units, and more specifically to a mobile system allowing for select and drag operation and including a logic system that remembers and maintains each new open aisle width and closed aisle width after the termination of movement of the mobile storage units.

BACKGROUND OF THE INVENTION

In a large number of mobile storage systems, mobile storage units are selectively movable with respect to one another in some manner, such as along tracks or rails to which the units are mounted. The units can be moved along the tracks or rails in a manually operated manner, or through the use of a motor operably connected to wheels disposed on the storage unit and rotatably engaged with the rails to enable the storage unit to move with respect to the rails. In those storage units employing an electric motor, upon activation of the motor by a user activated switch, the motor operates a drive system that rotates the wheels of the unit to move the unit along the rails in the desired direction.

Most prior art motorized mobile storage systems utilize one of two basic modes of operation. The first is a "push and hold" mode of operation. In a push and hold system, an operator "manually" moves one carriage at a time by pressing and holding a move button on a mobile storage unit until the unit reaches a desired location and the button is released. The main problem with such a system is that if several mobile storage units need to be moved in order open a desired aisle, the operation can be time consuming in that a user must sequentially move multiple aisles. Despite its shortcomings, the push and hold method of operation does provide benefits in that it provides an operator full control of the system. The operator can look down the aisle as the aisle is closing to ensure that the aisle is clear. If there is an obstruction in the aisle, the operator can stop the system by releasing the move button. The operator can further manually set the aisle width to accommodate for large overhanging objects or other obstructions that may protrude from the storage units into an aisle.

An alternative to the push and hold system is the "automatic" or "one touch move" system. In this type of system, an operator presses a button selecting the aisle or 4mobile storage unit to move, and the selected aisle opens by movement of the appropriate mobile storage unit. The mobile storage units move until a limit switch or other device is triggered, which occurs when the mobile storage unit has reached its end position. This end position (the distance between adjacent units) is typically adjustable only by a service technician. Such adjustment requires the technician to either physically adjust the position of a mechanical limit switch or set a new limit via software. While the automatic mode of operation is less time consuming than the push and hold mode of operation, the automatic mode does not allow the operator to control movement of the storage units when forming an aisle. Instead, mobile storage systems of this type incorporate a passive safety system to detect the presence of objects or obstructions between storage units, and the drive arrangement of each storage unit is responsive to the passive safety system to stop movement of the storage unit if an object is detected as an aisle is being closed. However, many known safety systems do not adequately detect overhanging shelved objects. If such objects protrude past the limit switch, it is possible that such objects may be struck by a moving carriage before the limit switch is reached and movement of the storage unit it stopped.

Therefore, it is desirable to develop a mobile storage system that combines the speed and efficiency of an automatic mode of operation with the user control provided by push and hold systems. Such a system would preferably allow a user to select an aisle and then manually move several carriages at a time as the selected aisle is opened. It is also desirable to develop a mobile storage system having the advantages discussed above, and which is further capable of maintaining the aisle width established by an operator in a move operation in subsequent operations to thereby protect overhanging media or other objects located in an aisle.

SUMMARY OF THE INVENTION

According to one aspect of the present invention, a mobile storage system includes a number of mobile storage units movably disposed with respect to one another, such as on two or more rails, in order to enable the storage units to be moved relative to one another along the rails. Each of the storage units is capable of holding a number of various types of items or objects thereon. Each mobile storage unit includes a logic system and at least one motion control actuator for creating a signal when actuated in a location at which an aisle is to be created. The mobile storage units in the system are connected such that a signal from a motion control actuator on one of the mobile storage units, which is to be moved where an aisle is desired, directs a run signal to at least one unit to cause one or multiple units to be driven successively away from a desired aisle location. If multiple units are moved together, a motion control actuator on the unit adjacent the closing aisle is operated to move the actuated unit and the other units. The mobile storage system also includes a logic system that remembers and maintains each new open aisle width and closed aisle width after the termination of a particular movement. The logic system is also designed to retain preset maximum and minimum aisle widths, and to refuse to return to an idle state if an aisle is left at a width greater than the preset maximum aisle width. The mobile storage system may also include an emergency stop actuator as well as visual signals associated with the motion control actuator and emergency stop actuator. In one embodiment, a first motion actuator and a second motion actuator are located on opposed sides of the mobile storage units.

According to another aspect of the invention, a method of opening and closing aisles among a number of mobile storage units includes selecting an aisle to be formed by actuating a motion control actuator on a mobile storage unit adjacent a desired aisle, and operating a motion control actuator on a mobile storage unit adjacent an existing aisle. Preferably, the mobile storage unit adjacent the existing aisle moves to close the existing aisle and drags any other mobile storage units between the unit adjacent the existing aisle and the selected aisle to be formed. The method may also include programming preset maximum and minimum aisle widths into a logic system as well as storing and maintaining the width of a new aisle once the new aisle is established.

According to still another aspect of the invention, a mobile storage system includes a plurality of mobile storage units that are movable toward and away from one another to define an aisle between a pair of the units. The mobile storage units are connected such that a signal established at a single mobile storage unit can direct movement of a single mobile storage unit or multiple units to create a desired aisle. The mobile storage system further includes a logic system on each unit to remember and maintain each new open aisle width and closed aisle width after termination of the movement.

Numerous other features, aspects, and advantages of the present invention will be made apparent from the following detailed description taken together with the drawing figures.

BRIEF DESCRIPTION OF THE DRAWINGS

The drawing figures illustrate the best mode currently contemplated as practicing the present invention.

In the drawings.

DETAILED DESCRIPTION OF THE INVENTION

Figure 1:
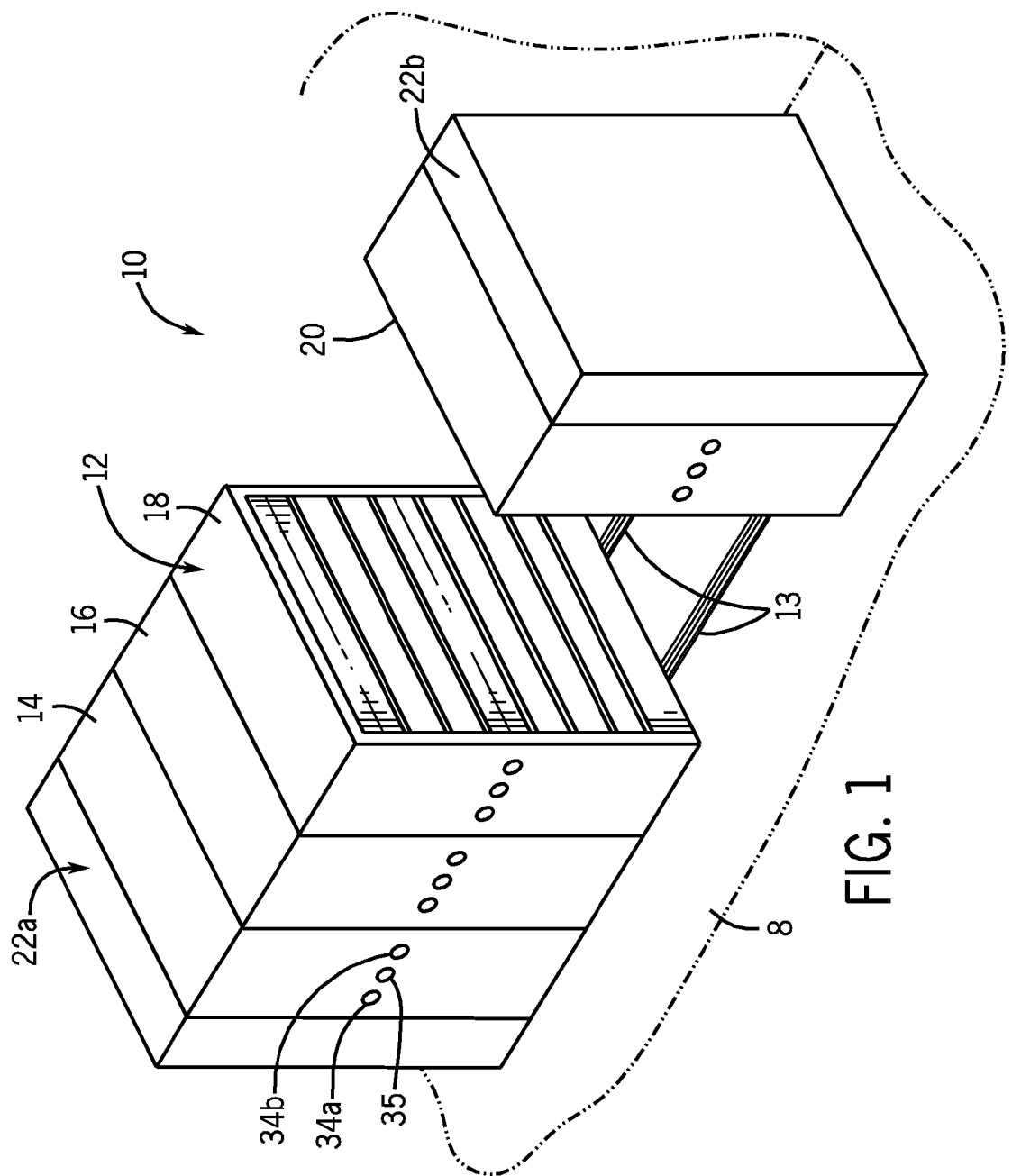
FIG. 1 is an isometric view of a representative mobile storage system incorporating the features of the present invention.
Figure 1A:
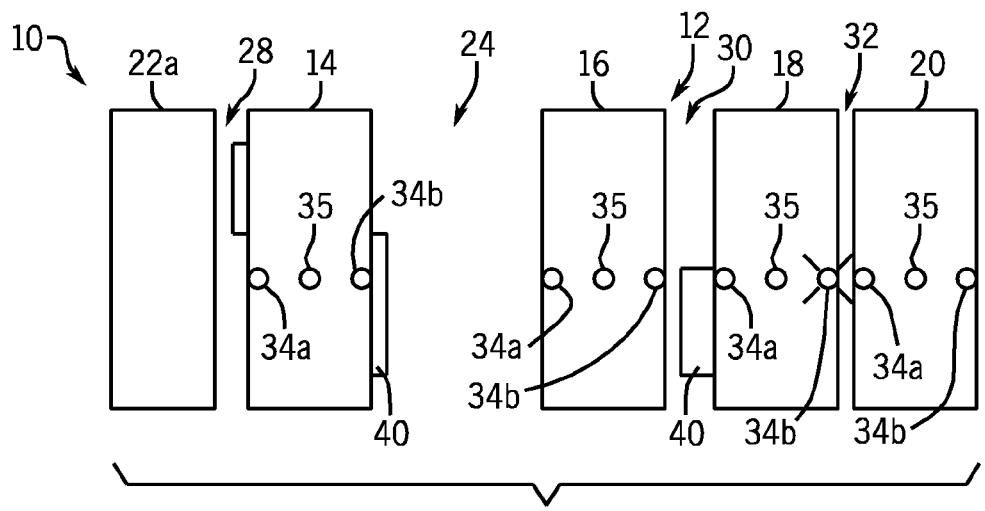
FIG. 1A is a side elevation view of the mobile storage system of FIG. 1 showing the mobile storage units in a first configuration.

With reference now to the drawing figures in which like reference numerals designate like parts throughout the disclosure, one embodiment of a mobile storage system used to store objects including oversized storage media 40 is indicated generally at 10 in FIGS. 1 and 1A. In this exemplary embodiment, the storage system 10 is disposed over a floor or other surface 8 and includes a pair of end units 22a, 22b between which extend a pair of parallel rails 13 secured to floor 8. Representatively, the end units 22a, 22b may be in the form of stationary storage units. The rails 13 movably support a number of individual mobile storage units 12 thereon through the engagement of spaced apart pairs of wheels (not shown) that are rotatably mounted to each storage unit 12 and are rotatably supported on the rails 13. It is understood that the configuration of the system 10 as illustrated is representative of any number of different configurations that are possible. While the mobile storage units 12 are illustrated as shelves, it is also understood that the storage units may be in the form or for example may be file cabinets, trays, lockers, platforms, bookcases, freezer lockers, refrigerated units, furniture storage units, tape storage units, or any other device intended for storing, filing, preserving, protecting, or accumulating any type of object or media.

The mobile storage system 10 may comprise any number of mobile storage units 12 or other mobile load carrying devices. The drawings show a series of four mobile storage units 14, 16, 18 and 20, although any lesser or greater number of storage units 12 may be included in the mobile storage system 10. As noted, the mobile storage units 12 may be of any well-known type, for example a carriage to which a storage rack, cabinet or the like is mounted. In a representative application, the mobile storage units 12 are positioned in side-by-side relation for limited travel to the right or to the left along one side of a loading or unloading aisle, and movement is controlled by the command of a user. The mobile storage units 12 are typically arranged between stationary end units, although the end units may also be movable. Left stationary end unit 22a is illustrated in FIG. 1A, and right stationary end unit 22b (FIG. 1) may be provided at the opposite end of the system 10. The stationary end units 22a, 22b could also be eliminated and the wall of a room may define the endmost extent of the mobile storage system 10. The mobile storage units 12 may be moved in a variety of ways as is known in the art, such by movement on floor mounted rails 13 that are engaged by wheels on the storage units 12, with a drive system that includes a reversible electric motor mounted in each one of the storage units. Each motor may typically include one or more drive wheels supported on one or more of the rails, in combination with driven wheels supported on other of the rails. Such arrangements are well known in the art and are described, for example, in U.S. Pat. Nos. 4,437,711, 4,733,923 and 5,569,910, which are expressly incorporated herein by reference.

Each mobile storage unit 12 includes identical controls and indicators at each end thereof, although it is also understood that the controls and indicators may only be at one end (e.g. if access to the opposite end is blocked). More specifically, each mobile storage unit 12 includes motion control actuators such as a left motion button 34a and a right motion button 34b. Each mobile storage unit 12 also preferably includes an emergency stop actuator such as a stop or reset button 35 located between the motion buttons 34a, 34b. The left 34a and right 34b motion buttons and the stop buttons 35 preferably include some visual signal associated with each, such that the motion buttons 34a, 34b and stop buttons 35 are capable of being selectively illuminated depending on the particular motion command. Representatively, the motion buttons 34a, 34b may be green industrial momentary-contact buttons with backlighting (or alternatively a separate green LED) to indicate status. The stop buttons 35 may be an industrial push-pull type wherein the button 35 may be pushed to activate an emergency stop and twisted, pulled or otherwise operated to clear the stop. The stop buttons 35 are also preferably backlit (or alternatively have a separate red LED indicator) to indicate status. The stop button 35 may also be used as a reset for any associated photo sweep. Additional controls and indicators may also be included in the system 10 such as a safety activated indicator as well as other controls and indicators as is known in the art.

The motion buttons 34a, 34b preferably include electrical components which communicate with the motors on the respective mobile storage units via a logic system. The left 34a and right 34b motion buttons are utilized to actuate movement in the left or right directions, respectively, during the single unit movement command described below. Alternatively, the left 34a and right 34b motion buttons may be used to either select an aisle to be formed, or perform the drag function during the multiple unit movement command described below.

FIG. 1A illustrates an open aisle marked 24 between mobile storage unit 14 and mobile storage unit 16. Additionally, there are also small spaces or closed aisles 28, 30 and 32 of varying width between the other mobile storage units 12 not adjacent the aisle 24. It should be understood that any one of these small spaces or closed aisles 28, 30, 32 can be enlarged to the full width of an aisle such as aisle 24 by moving a single or multiple mobile storage units 12 so as to close aisle 24 and enlarge a space between alternative mobile storage units 12. As can be appreciated from the drawings in FIGS. 1A, 2 and 3, the small spaces or closed aisles 28, 30, 32 are not uniform in width. A key feature of the present system 10, discussed in greater detail below, is that it enables a user to set and change both the open and closed aisle widths (dynamic aisle widths) to accommodate overhanging objects or media 40, and to have the system remember and maintain these widths during subsequent system movements.

Figure 2:
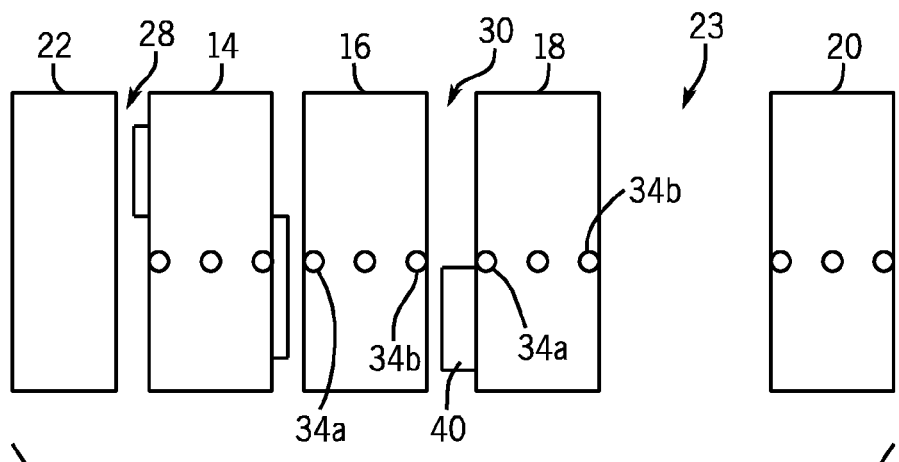
FIG. 2 is a side elevation view of the mobile storage system of FIG. 1 showing the mobile storage units in a second configuration.
Figure 3:
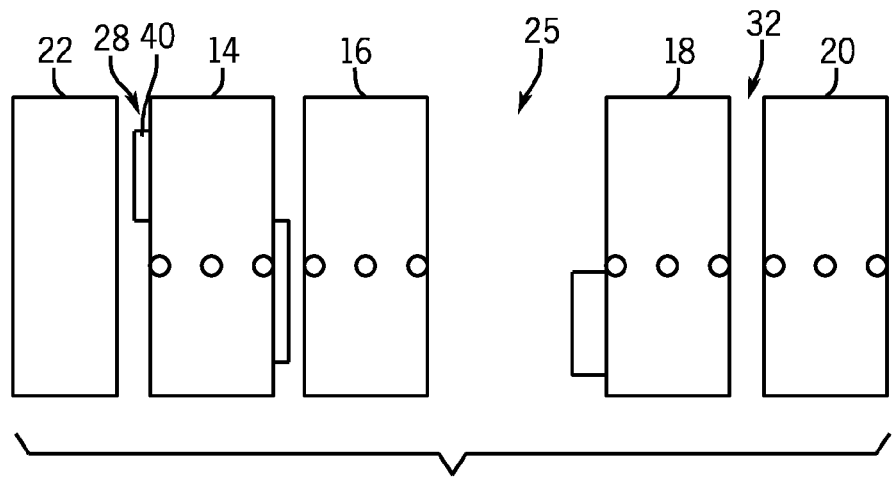
FIG. 3 is a side elevation view of the mobile storage system of FIG. 1 showing the mobile storage units in a third configuration.

As noted above, two types of movement are utilized by the system 10, namely single unit movement and multiple unit select and drag movement. FIGS. 2 and 3 illustrate the single unit movement. When the system 10 is in an idle state, wherein the mobile storage units 12 are motionless, the visual signals associated with each of the motion buttons 34a, 34b are lit, the emergency stop buttons 35 are not lit (assuming they are all inactive or pulled out) and the safety activated indicators are not lit (assuming no sweep fault is present). Referring to FIG. 2, if a user desires to create a new open aisle between mobile storage units 16 and 18, the user need only move a single mobile storage unit, namely unit 18. In order to move a single unit, a user presses and holds the motion button 34b on the mobile storage unit 18 near the existing open aisle 23. The user presses and holds the right motion button 34b to move unit 18 to the right. Upon actuation of motion button 34b on storage unit 18, the motion buttons adjacent the opening aisle will flash, (e.g. 34a on unit 18 and 34b on unit 16) the pressed motion button (34b on unit 18) will be solidly lit, and all the others will be dark. The flashing of the lights may be timed, for example twenty seconds. Mobile storage unit 18 is moved to close the existing aisle 23 and open the new aisle 25 (FIG. 3) in the space formerly defined as closed aisle 30 (FIG. 2). The single unit movement is controlled entirely by the user barring the activation of any safety stops.

During the single unit movement, the user looks down the closing aisle 23 to ensure that there are no hazards present such as individuals or other objects, and no overhanging or fallen storage media or objects. The user controls the new width of the closed aisle 32 (FIG. 3) within certain preset limits described below. For example, a user may desire a slightly wider closed aisle than normal to accommodate overhanging media or objects such as representatively shown at 40. In the system 10, once the unit (e.g. unit 18) has been moved into a position within the preset limits, the system 10 returns to idle and the closed aisle width 32 between units 18 and 20 is remembered by the system 10 and maintained during subsequent storage unit movements.

As noted above, preset limits to the maximum and minimum widths of the closed aisle are preferably established and included in the logic of the system 10. In the illustrated embodiment, if any closed aisle is left at a width greater than a predetermined width, e.g. 14 inches, the aisle is considered open by the system and the system will not return to idle until the aisle is closed to a width equal to or less than the predetermined width. If the distance between the aisles is equal to or less than the predetermined width, e.g. 14 inches, the aisle is considered closed. If the width is less the predetermined width and greater than a preestablished absolute near limit, e.g. 6 inches, this new distance will become the new dynamic near limit and be maintained during subsequent unit moves.

Figure 4:
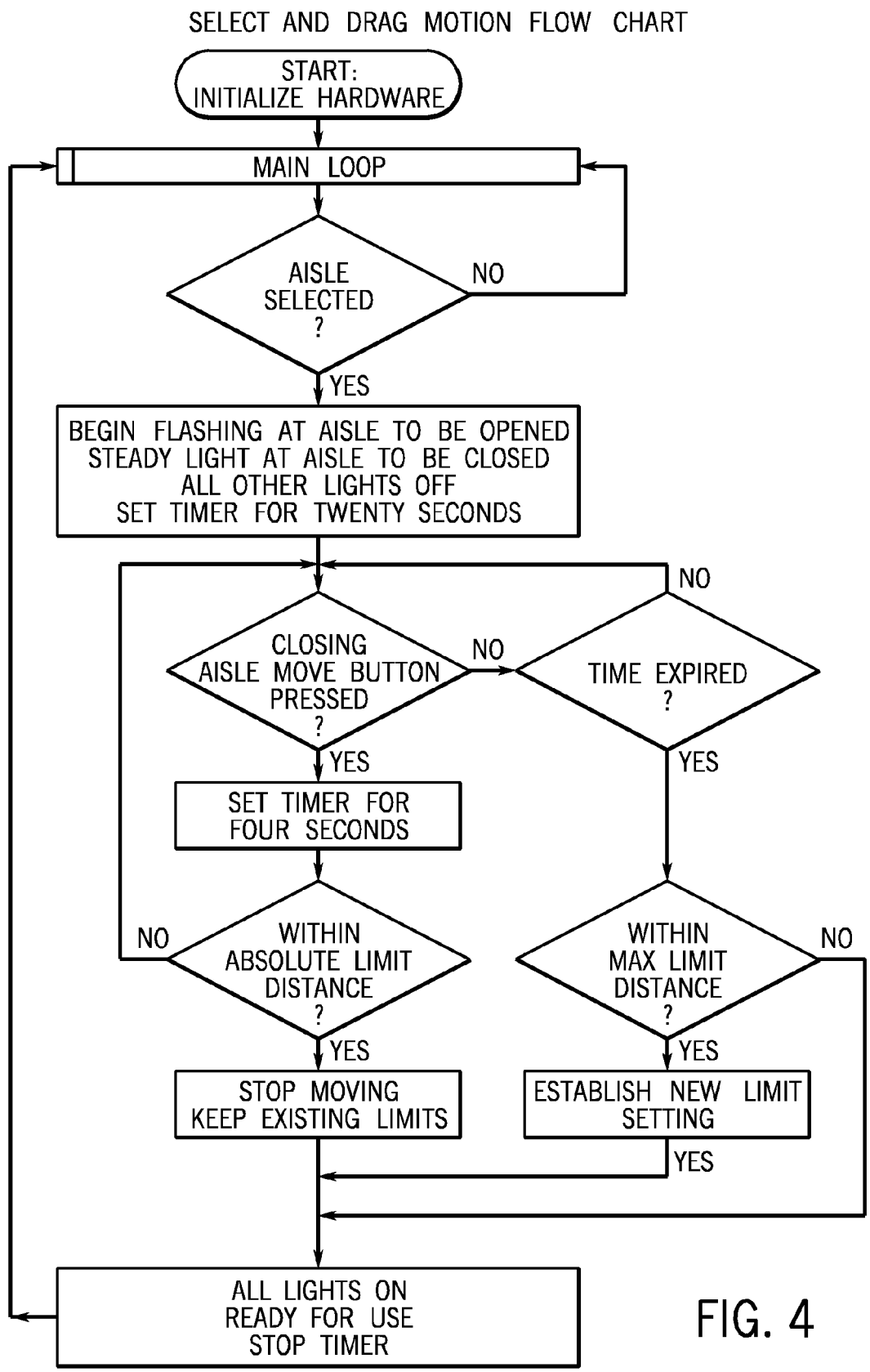
FIG. 4 shows a flow chart for software programmed into the logic system of the mobile storage system of FIG. 1.

If a user needs to move multiple units 12 in order to form a new aisle, e.g. from the configuration of FIG. 1 to the configuration of FIG. 2, the system 10 uses a select and drag mode of operation. FIG. 4 shows a flow chart for software programmed into the logic system of the mobile storage system. In the select and drag mode of operation, a user first selects the desired aisle for opening by pressing a motion button 34a, 34b to either the right or the left of the desired aisle. For example, if a user desires to form an aisle between units 18 and 20 in FIG. 1, the user presses either right motion button 34b on unit 18 or left motion button 34a on unit 20. Once one of the motion buttons 34a, 34b has been selected, the motion button backlighting on all mobile storage units 12 extinguish, except for the two surrounding the selected aisle (e.g. right motion button 34b on unit 18 and left motion button 34a on unit 20), which remain solidly lit. The motion button on the unit able to be moved (e.g. left motion button 34a on unit 16) flashes. Once the flashing button is pressed and held, the units between the selected aisle and the leading unit 16 move until a new aisle is formed. As the leading unit begins to move, it "drags" along the required trailing units as the selected aisle opens while maintaining any preestablished closed aisle widths, such as 30 between units 16 and 18, thereby preventing the crushing of any overhanging media or objects 40. The user walks with the leading unit until it reaches a desired stop position and then the user releases the motion button. Again, the user looks down the closing aisle 24 to ensure that there are no hazards present such as individuals or other objects, and no overhanging or fallen storage media or objects.

As noted above, the final move position in the select and drag movement must also be within the preset limits of maximum and minimum widths of the closed aisle. If the closed aisle is left at a width greater than the predetermined width, e.g. 14 inches, the aisle is considered open by the system and the system will not return to idle until the aisle is closed to a width equal to or less than the predetermined width. If the distance between the aisles is equal to or less than the predetermined width, the aisle is considered closed. If the width is less than the predetermined width and greater than the preestablished absolute near limit, this new distance will become the new dynamic near limit and be maintained during subsequent unit moves.

During any motion command, if any emergency stop button 35 is pressed, all movement of system 10 stops and the specific emergency stop button 35 activated will light up. Any pressed motion button 34a, 34b must be released, and the emergency stop button 35 must be deactivated to clear the emergency stop condition. Once the emergency stop button 35 is deactivated, the user may move the system normally. If a sweep is activated during motion, the unit with the sweep will stop and the offending aisle is locked. The leading unit and any following unit ahead of the sweep fault may continue to move normally. All motion buttons must be released and the desired aisle reselected to open the desired aisle. If a photo sweep is activated, the motion button light on the faulted sweep will flash rapidly. The sweep obstruction must be cleared and the stop button released to clear the locked aisle.

As presently described, each mobile storage unit 12 includes a storage unit logic module having signal lines to control the various functions of the system. A variety of known logic boards could be utilized such as a Power Pro logic board. Software modifications can be performed to achieve the desired operation. The logic modules in adjacent units are preferably interconnected by signal lines such that the motion commands relayed by a single mobile storage unit 12 can be relayed, processed, and coordinated with the preset limits throughout the system. Thus, when a motion command signal is issued, all of the related logic systems communicate in making a decision as to whether they should cause their related on-board electric drive motors to run in one direction or the other to effect the opening of an aisle. Additionally, as noted above, the logic modules collectively remember both the dynamic open and closed aisle widths established by either previous single unit movements or multiple unit select and drag movements. For example, referring to FIGS. 1A and 2, during the multiple unit motion illustrated, the small space or closed aisle width 30 between unit 16 and 18 is maintained during the movement of units 16 and 18. This is critical in preventing damage to overhanging media or objects, such as 40, illustrated in FIGS. 1 and 2.

Preferably, the limits are monitored using known infrared sensors. A PC board with a small microprocessor may be utilized to interface the IR sensors. Preferably, the IR sensors will be located in the control housing and two sensors will be used on each mobile storage unit 12. As noted above, some limits will be defined, namely an absolute minimum closed aisle width limit (e.g. no less than six inches), and a maximum closed aisle width (e.g. no more than 14 inches). Dynamic programmable near limits, however, can be established and maintained to protect overhanging media or objects 40. The limits are preferably stored in a non-volatile memory such that the power-cycle will not erase the set limits.

The logic modules of the system may also coordinate and relay information from multiple sources. For example, preferably, if any of the motion buttons 34a, 34b other than the flashing button is pressed during the multiple unit select and drag motion commands, the command is ignored. Likewise, if a stop button 35 is pressed at any time, the system returns to idle state until the subsequent release of the stop button 35. The system 10 also preferably includes a timing mechanism. For example, if a motion button 34a, 34b is released before the motion is complete, a user preferably has a predetermined time such as fifteen seconds to restart the motion before the system returns to an idle state. Likewise, if no button is pressed after an aisle is selected, the system 10 preferably returns to an idle state after the predetermined time. If the motion completes normally, the system preferably returns to idle state in a predetermined time, such as ten seconds. If multiple aisles are opened (defined as being out of range of the IR distance sensors or outside the defined maximum width limit), only the unit 12 closest to the desired aisle can move. Once this aisle is closed, the user may select a new aisle to move the system 10 again. The system may also include safety features such as a dual photo sweep on each mobile storage unit 12. Representatively, a custom Eaton/Cutler-Hammer photo sweep may be used.

It can thus be appreciated that mobile storage system 10 provides for single unit movement, multiple unit select and drag movement, as well as providing a system that "remembers" and maintains dynamic closed aisle width during subsequent motion commands. The system 10 replaces the mobile storage systems of the prior art which include select and push modes of operation wherein the user pushes multiple units from a position adjacent the aisle to be formed. Thus, this system maintains the time-saving benefit of the prior art select and push multi-unit movement, however, the system achieves a key safety advantage in that the operator maintains complete control of the system from a position adjacent the closing aisle as opposed to a position adjacent the aisle to be formed. Because the operator looks down the closing aisle as the aisle is closing during the movement, he or she can see if someone or something (like overhanging media) is in the way of the advancing storage unit. If something is obstructing the aisle, the operator can quickly stop the system by letting go of the motion button 34a, 34b.

The ability of the system 10 to remember and maintain the dynamic aisle widths is also an improvement over known automatic move or one touch move systems. In most prior art systems, the units move until a limit switch or other device is triggered, which tells the unit that it has reached its end position. The disclosed system 10 provides a mobile storage system wherein the dynamic aisle widths are remembered and maintained by the system. Thus a user can change the closed aisle width to accommodate overhanging media 40 (or the removal of overhanging media 40 in subsequent storage unit movements). As can be appreciated, the disclosed system combines the speed and efficiency of an automatic move system with the safety and user control of traditional select and push systems.

While the system has been shown and described with respect to a specific embodiment, it is contemplated that certain details may vary from the specific construction as disclosed, while still falling within the scope of the present invention. For example, as noted previously, it is contemplated that any number of mobile storage units can be utilized with the present invention. In addition, it is also contemplated that additional safety features, such as safety bars and floors, as well as numerous other components of known mobile storage systems could be integrated into the inventive system 10.

Various alternatives are contemplated as being within the scope of the following claims particularly pointing out and distinctly claiming the subject matter regarded as the invention.

We claim:

1. A mobile storage system comprising:
   a plurality of continuously spaced apart storage units at least some of which are movable toward and away from one another or a stationary unit to define an aisle between each pair of the units, the aisle having a width and being opened and closed so as to create a variable spacing between the pair of units;
   a means on each of the movable storage units for driving said movable storage unit in two directions;
   a logic system provided with a memory on each movable storage unit for setting and changing open aisle and closed aisle widths;
   at least one manually controllable motion control actuator on each movable storage unit for creating a signal when actuated at a movable storage unit where an aisle is desired;
   said movable storage units being connected such that a signal from said motion control actuator on one of the movable storage units which is at a first location at which an aisle is to be formed, directs a run signal to one or more of the other movable storage units including an end storage unit at a second location adjacent an existing aisle, wherein the second location is remote from the first location, to cause said one or more of the movable storage units to be moved away from said first location to close the existing aisle at the second location and form an aisle at the first location; and
   wherein, when the one or more other movable storage units comprises a plurality of movable storage units that are to be moved away from the first location to form the aisle, the plurality of movable storage units are moved together by operation of a motion control actuator on the end storage unit adjacent the existing aisle in order to move the end storage unit to close the existing aisle and the other storage units between the end storage unit and the first location to form the aisle at the first location.

2. The mobile storage system of claim 1, wherein said logic system remembers and maintains each new open aisle width and closed aisle width after the termination of said movement.

3. The mobile storage system of claim 1, wherein said logic system retains preset maximum and minimum aisle widths.

4. The mobile storage system of claim 3, wherein said logic system considers an aisle open and refuses to return to an idle state if an aisle is left at a width greater than said preset maximum aisle width.

5. The mobile storage system of claim 3, wherein said logic system will consider an aisle closed if the aisle width is equal to or less than the preset maximum aisle width, and said logic system remembers and maintains the open aisle width.

6. The mobile storage system of claim 1, further comprising an emergency stop actuator manually controllable by an operator during movement of the units.

7. The mobile storage system of claim 6, further comprising visual signals associated with said at least one motion control actuator and said emergency stop actuator.

8. The mobile storage system of claim 1, wherein said at least one motion control actuator comprises a first motion actuator and a second motion actuator on opposed sides of said mobile storage unit.

9. A method of opening and closing aisles among a row of continuously spaced apart mobile storage units in a mobile storage system, wherein at least some of the mobile storage units are movable toward and away from each other or a stationary unit to define an aisle between each pair of units in which variable spacing is maintained and wherein multiple storage units may be moved in a single movement, said method comprising:
    selecting an aisle to be formed in a first location by means of actuating a motion control actuator on a first mobile storage unit at the first location adjacent a desired aisle to be formed; and
    operating a motion control actuator on a second mobile storage unit adjacent an existing aisle in a second location remote from the first location,
    wherein said second mobile storage unit adjacent said existing aisle moves to close said existing aisle, and drags any other mobile storage units between said second storage unit and said first storage unit in order to move said second storage unit and said other storage units away from said first location to form the aisle at said first location.

10. The method of claim 9, further comprising the act of programming preset maximum and minimum aisle widths into a logic system.

11. The method of claim 9, further comprising the acts of storing and maintaining a width of said aisle to be formed once said aisle to be formed is established.

12. The method of claim 9, further comprising the act of establishing a visual signal on the motion control actuators adjacent the desired aisle to be formed and adjacent an existing aisle.

13. A mobile storage system comprising:
    a plurality of continuously spaced apart mobile storage units at least some of which are movable toward and away from one another or a stationary unit to define an aisle having a width of variable spacing between each pair of the units, said movable storage units being connected such that a signal established at a single storage unit can direct movement of a single mobile storage unit or multiple storage units to create a desired aisle and maintain the variable spacing between each pair of units, wherein an operator maintains complete control of the movement until the movement is finished; and
    a logic system on each unit wherein said logic system remembers and maintains each new open aisle width and closed aisle width after the termination of a movement,
    said movable storage units being connected such that a signal from a motion control actuator on one of the movable storage units, which is at a first location at which an aisle is to be formed, directs a run signal to one or more of the other movable storage units including an end storage unit at a second location adjacent an existing aisle, wherein the second location is remote from the first location, to cause said one or more other movable storage units to be moved away from said first location to close the existing aisle at the second location and form an aisle at the first location; and
    wherein, when the one or more other movable storage units comprises a plurality of movable storage units that are to be moved away from the first location to form the aisle, the plurality of movable storage units are moved together by operation of a motion control actuator on the end storage unit adjacent the existing aisle in order to move the end storage unit to close the existing aisle and the other storage units between the end storage unit and the first location to form the aisle at the first location.

14. The mobile storage system of claim 13, further comprising at least one motion control actuator on each mobile storage unit for creating said signal.

15. The mobile storage system of claim 14, wherein said at least one motion control actuator comprises a first motion actuator and a second motion actuator on opposed sides of said mobile storage unit.

16. The mobile storage system of claim 13, wherein said logic system retains preset maximum and minimum aisle widths.

17. The mobile storage system of claim 16, wherein said logic system considers an aisle open and refuses to return to an idle state if an aisle is left at a width greater than said preset maximum aisle width.

18. The mobile storage system of claim 1, further comprising an emergency stop actuator manually controllable by the operator during movement of the units.

19. The mobile storage system of claim 6, further comprising visual signals associated with said at least one motion control actuator and said emergency stop actuator.

* * * * *